United States Patent
Zhang et al.

(10) Patent No.: US 7,124,047 B2
(45) Date of Patent: Oct. 17, 2006

(54) MATHEMATICAL MODEL USEFUL FOR DETERMINING AND CALIBRATING OUTPUT OF A LINEAR SENSOR

(75) Inventors: Yongcang Zhang, Troy, MI (US); David E. Herbert, Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/934,058

(22) Filed: Sep. 3, 2004

(65) Prior Publication Data

US 2006/0052959 A1    Mar. 9, 2006

(51) Int. Cl.
*G01C 19/00*    (2006.01)
*G01C 25/00*    (2006.01)
*G01D 18/00*    (2006.01)

(52) U.S. Cl. .......................................... 702/104; 714/47
(58) Field of Classification Search ...................... None
See application file for complete search history.

(56) References Cited

U.S. PATENT DOCUMENTS

| | | | |
|---|---|---|---|
| 5,449,329 A | 9/1995 | Brandon et al. | |
| 5,642,278 A | 6/1997 | Wang et al. | |
| 5,748,431 A | 5/1998 | Goodnight et al. | |
| 5,853,350 A | 12/1998 | Hasegawa et al. | |
| 5,867,031 A | 2/1999 | Wang | |
| 5,951,616 A | 9/1999 | Chiba et al. | |
| 6,174,263 B1 | 1/2001 | Tabata et al. | |
| 6,193,630 B1 | 2/2001 | Janasek et al. | |
| 6,198,275 B1 | 3/2001 | Wolf et al. | |
| 6,396,259 B1 | 5/2002 | Washeleski et al. | |
| 6,435,049 B1 | 8/2002 | Janasek et al. | |
| 6,446,019 B1 | 9/2002 | Kynett et al. | |
| 6,594,573 B1 | 7/2003 | Rossmann et al. | |
| 6,790,160 B1 | 9/2004 | Kato et al. | |
| 6,875,156 B1 | 4/2005 | Steiger | |
| 6,891,710 B1 | 5/2005 | Mayr et al. | |
| 2001/0023393 A1 | 9/2001 | Hagiwara et al. | |
| 2003/0011454 A1 | 1/2003 | Mayr et al. | |
| 2003/0102862 A1 | 6/2003 | Goto et al. | |
| 2004/0128050 A1 | 7/2004 | Rieger et al. | |
| 2005/0210337 A1* | 9/2005 | Chester et al. ................. | 714/47 |

* cited by examiner

*Primary Examiner*—John Barlow
*Assistant Examiner*—Sujoy Kundu
(74) *Attorney, Agent, or Firm*—Jaquez & Associates; Martin J. Jaquez, Esq.; Lisa M. Griffith, Esq.

(57) ABSTRACT

The present invention relates to a method of analyzing accuracy of linear sensor output based on a theoretical prediction of the output model. The method comprises steps of: analyzing a statistically significant number of linear sensors to obtain operating profiles at two or more operating conditions; individually testing a linear sensor to obtain at least four data points; developing a theoretical prediction of the output model for each operating condition from the four data points; and comparing accuracy of the relationship between the theoretical prediction of the output model to sensor output in the operating profile corresponding to a given input for the same operating condition. Also disclosed are calibration algorithms associated therewith, as well as mechatronic units and further assemblies therefrom.

23 Claims, 2 Drawing Sheets

MATHEMATICAL MODEL USEFUL FOR DETERMINING AND CALIBRATING OUTPUT OF A LINEAR SENSOR

BACKGROUND

The present invention relates to linear sensors, as well as calibration and use of such sensors. The invention is applicable to systems comprising one or more linear sensors.

Sensors are employed in a multitude of applications throughout a variety of industries. Sensors can be used to detect many different properties. For example, it is well known to use sensors for detecting pressure, strain, temperature, torque, and many other properties. In most industrial applications, sensors are also referred to as transducers.

Whether a sensor is linear depends on how its output (e.g., electrical signal such as voltage) correlates with the measured input (e.g., pressure, strain, temperature, torque, et cetera). If the relationship between input and output is essentially linear when operating the sensor at constant temperature, the sensor is then understood to be linear. If not linear, the sensor is characterized according to what other type of relationship (e.g., exponential) exists between the sensor's input and output.

In some applications, one or more sensors can be integrated within a larger unit.

For example, mechatronic units provide mechanical and electronic (e.g., microprocessor and/or memory) components within one integral unit. Mechatronic units can be rather small, encompassing no more than a sensor and an electronic component which can, for example, store a calibration algorithm for the individual sensor. Mechatronic units in industrial applications, however, often include a multitude of components operating together to perform a discrete function.

One class of mechatronic unit widely used in industry is electrohydraulic in nature, integrating hydraulic and electronic components within one integral unit. Many electrohydraulic units are known to include one or more sensors to facilitate desired and reliable operation of the unit. For example, solenoid operated pressure control valves are electrohydraulic units in which sensors are commonly utilized. In applications of this type, sensors can be utilized, for example, to determine and relay to an electronic component (such as a pressure controller) pressure output from and/or input to such a valve. Relaying pressure readings in this manner can, for instance, assist an electronic pressure controller in adjusting the hydraulic components of the valve during operation in order to obtain a desired pressure output.

Units comprising solenoid operated pressure control valves have found applicability in, for example, applications for controlling the flow of hydraulic fluid in automatic transmissions for motor vehicles. In automatic transmissions of this type, shifting of transmission speed ratios is controlled by an electronic controller that provides an electrical signal to the solenoid operated valve, which in turn provides a fluid pressure signal to a pressure responsive actuator for effecting a desired transmission speed ratio change.

Accuracy and reliability of mechatronic units (whether they be relatively small or larger, such as automatic transmission systems employing solenoid operated pressure control valves), however, are often predicated on calibration of sensors and other components within the system. Known mechatronic units comprising a sensor calibration algorithm in the electronic component typically rely upon sensor calibration that is determined on a sensor-by-sensor basis prior to the assembly of the sensors into a complete mechatronic unit.

Yet, the calibration of sensors in assembled mechatronic units (e.g., solenoid operated pressure control valve systems) and maintenance of sensor calibration during operation has proven challenging. As is known by those skilled in the sensor art, the output of sensors at pre-assembly often varies from the sensor output obtained after assembly into a mechatronic unit. The pre-assembly sensor output also may vary from sensor output under varying operating conditions.

For example, environmental variations such as temperature changes and exposure to fluid contaminants, as well as viscosity fluctuations, can impact sensor output. FIG. 1 illustrates variation in individual sensor output based on temperature variations during operation. FIG. 1 shows the relationship between sensor output and input at three different temperatures (i.e., Temp. A, Temp. B, and Temp. C). Such variations observed in sensor output at varying temperatures can detrimentally impact continued accuracy of systems relying on precise output of sensors during operation. Conventional sensor calibration algorithms, if used, often do not factor in these environmental variations.

Still other post-assembly variations, such as those caused by sensor packaging and attachment can also influence sensor output measurements. For example, the methods for packaging and attachment of a sensor to a substrate can influence sensor outputs. In addition, the materials used for sensor packaging and attachment (e.g., type of the substrate material, such as ceramic or "FR4") can also influence sensor outputs after its assembly into a final product.

Furthermore, when more than one sensor is employed within a mechatronic unit or combination of units, sensor variance between parts imparted during normal manufacturing processes can further complicate accurate calibration of the mechatronic units during operation. For example, FIG. 2 illustrates variations in sensor output based on part-to-part variations created during sensor manufacture. Illustrated therein is the relationship between sensor output of three similar sensors obtained from different manufacturing lots (i.e., Part A, Part B, and Part C) and sensor input. The data represented in FIG. 2 is obtained while operating the three different sensors under the same operating conditions (e.g., at the same temperature). Conventional calibration algorithms typically are not universally applicable to various types of sensors. Further, conventional calibration algorithms do not account for individual variances (e.g., those imparted during normal manufacturing processes) within each class of sensor.

Factoring in environmental and part-to-part variations, desired sensor output can vary by up to approximately 50% from actual sensor output in assembled mechatronic units. Not surprisingly, such large deviations in accuracy are often problematic. Thus, there is a need for improvement in techniques used to calibrate units employing linear sensors and to maintain accurate calibration thereof during operation.

While certain attempts have been made to minimize deviations in the accuracies of sensor output, those attempts are not without their drawbacks. Notably, many of these techniques require additional hardware and/or burdensome individual testing of each sensor.

For example, one conventional technique for minimizing deviations in the accuracy of sensor output involves individually calibrating each sensor after packaging. This individual calibration step is followed by separate signal conditioning and amplification of the sensor in order to facilitate obtainment of linear output under all operating conditions. Yet, such a technique requires manual setup by an end user using a paper "calibration sheet." As anticipated, that manual process can be very inefficient, particularly when utilizing a combination of multiple sensors within a larger mechatronic unit.

Alternatively, instead of requiring a paper calibration sheet, an individual sensor can be coupled to an application specific integrated circuit (ASIC) having an individual sensor calibration algorithm encoded within. Requiring the use of an ASIC in this manner, however, is very costly and adds often undesired physical bulk to each individual sensor and hence the unit within which it is placed for operation.

Another technique for minimizing deviations in the accuracy of sensor output involves physical "trimming" of packaged sensors such that each individual sensor provides the same output at all operating conditions. Again, this technique has its drawbacks, one of which is the decrease in process efficiency associated with the trimming process. Another drawback is that signal conditioning is often required with this technique, which has the effect of decreasing overall process efficiency.

Further techniques for minimizing deviations in sensor accuracy after assembly and during operation are desirable. In particular, improved calibration methods are needed, especially those that promote overall process efficiency.

SUMMARY

The present invention relates to a mathematical model found useful for determining output of a linear sensor and ensuring that such output provides acceptable tolerances for an intended application. The invention is applicable to systems comprising one or more linear sensors. The mathematical model is advantageously applied, for example, toward calibration and use of such a linear sensor in a mechatronic unit.

The present invention provides an efficient method for calibrating sensors for continued accuracy during operation. Advantageously, the method of the invention imparts efficiency during setup and operation of an assembled mechatronic unit by an end user in that time consuming and expensive calibration steps are not needed after final assembly of the sensors within a mechatronic unit. Nevertheless, calibration algorithm and sensor characterization data stored within the mechatronic unit accounts for variations in sensor performance after final assembly into a mechatronic unit and under different operating conditions.

In one exemplary embodiment, an inventive mathematical model and associated calibration techniques are useful for operation with valves in conjunction with, for example, automatic shifting speed change transmissions employed in motor vehicles. In this exemplary embodiment, electrically operated solenoid valves are controlled by an electronic computer for controlling the flow of pressurized fluid to transmission shift actuators, such as band clutch actuators, employed in the transmission shifting operation. When operated as such, solenoid valves are capable of sensing line pressure in communication with an electronic controller in order to regulate line pressure to a desired value. Use of the inventive calibration technique enables sufficiently accurate control of the output pressure to shift actuators employed in the transmission shifting operation. The calibration algorithm and minimal sensor characterization data may advantageously and simply be encompassed within the electronic controller to improve yield of the desired pressure output based upon the current input to the valve from the controller.

DETAILED DESCRIPTION

Figure 1:
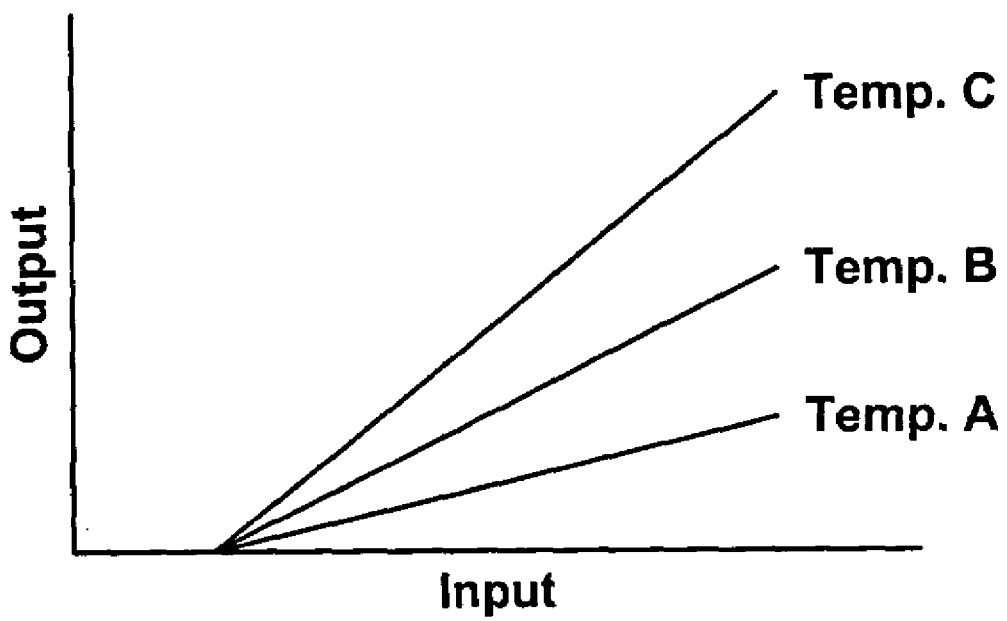
FIG. 1 is a prior art graphical representation of sensor output based on differences in operating temperature thereof.
Figure 2:
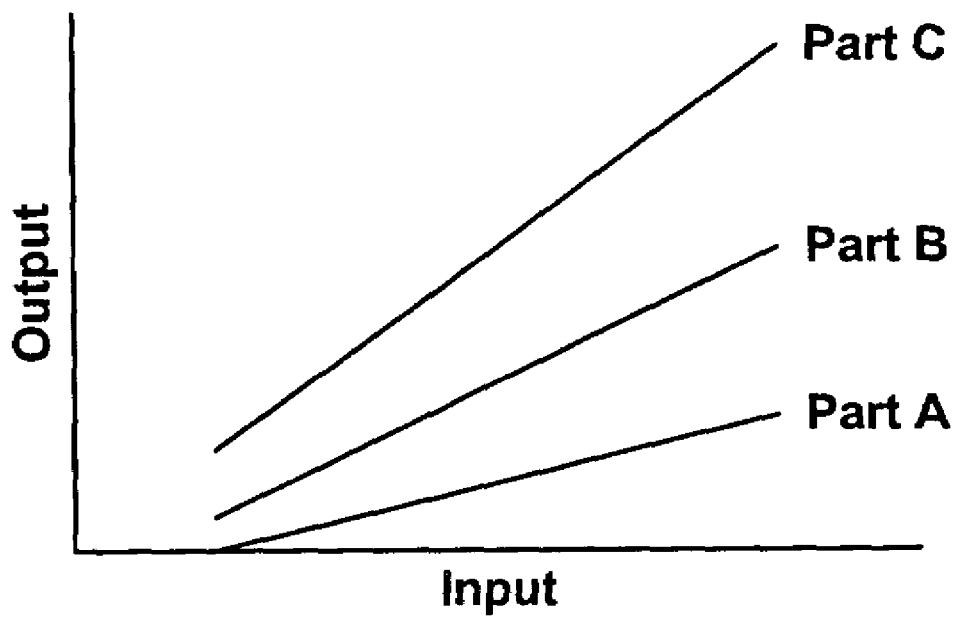
FIG. 2 is a prior art graphical representation showing variations in output from different sensors originating from one manufacturing lot when measured at a single operating temperature.

The present invention relates to a mathematical model enabling accurate determination of an output of a linear sensor. The inventive mathematical model advantageously enables accurate sensor output under a range of operating conditions. The mathematical model is universal in that it is applicable for use with any type of sensors that are linear.

A wide variety of linear sensors are commercially available, for example, many of which are silicon-based. For example, companies known to supply linear sensors include GE NovaSensor (Fremont, Calif.), Honeywell (Freeport, Ill.), IC Sensors (Milpitas, Calif.), and Silicon Microstructures Inc. (Milpitas, Calif.). Linear sensors are also custom-manufactured for certain applications. The invention applies to all linear systems, no matter what type. The invention is also applicable to any mechatronic units employing linear sensors.

During implementation, the inventive mathematical model can be used to generate a calibration algorithm for a particular type of linear sensor. The calibration algorithm can then be used to generate a calibration curve that operates in conjunction with one or more individual sensors of the same type as the sensors upon which it was derived. When applying the calibration algorithm, creation of the final calibration curve for an individual sensor within the assembly requires input of only four data points. The calibration algorithm can thus be utilized to easily and efficiently improve accuracy of the sensors during operation in a final assembly under a variety of conditions.

The calibration algorithm for any given type of linear sensor can be derived based upon the inventive mathematical model (theoretical prediction of the output model) and statistically significant data obtained after normal manufacture of the particular sensors for which it is to be used. Data for this process can be efficiently obtained during conventional "end-of-line" sensor testing prior to assembly of the sensors so manufactured or commercially obtained into final assemblies, such as mechatronic units. By obtaining data in this manner, users of the final mechatronic units containing the calibration algorithm do not need to undertake expensive and time-consuming calibration steps in order to ensure accurate operational sensor output.

After final assembly and once calibrated according to the invention, sensors generally do not need to be calibrated again during continued operation. However, if operating conditions change, the sensors can be easily recalibrated by merely performing the calibration algorithm again after determining only four new data points based on the changed operating conditions. This calibration can be simply and efficiently performed without the need of disassembling the unit within which the sensors are integrated.

Step A: First, the relationship between sensor input and output is statistically analyzed to yield statistically significant data representing actually measured sensor output. A statistically significant number of sensors is selected for this analysis. This number depends on the reliability and confidence level desired. Generally about 30 to about 300 sensors is all that is needed to provide a relatively high level of reliability and confidence for most industrial applications.

In one embodiment, the statistically significant number of sensors is compiled by individually selecting sensors from more than one manufacturing lot and/or from sensors manufactured or purchased over an extended period of time in order to obtain an accurate sampling of manufactured sensors. For example, the sensors can be randomly selected throughout two or more weeks of sensor manufacture. Alternatively, the sensors may be purchased from different manufacturing sources. By selecting the sensors in this manner, impact due to variations in manufacture are reduced or eliminated.

The sensors so selected are tested in order to generate an operating profile for each sensor at any given operating condition. In one embodiment, this testing is performed during normal end-of-line testing after sensor manufacture.

In one embodiment, each operating profile is developed by generating and recording output data for the sensor based on input at sufficiently spaced increments under constant operating conditions (e.g., temperature and pressure). The measured output (e.g., voltage) is generated based on a continuum from minimum to maximum input (e.g., pressure, strain, temperature, torque, or other measurable property). In one embodiment, the data so generated is recorded at a statistically significant number of approximately evenly spaced increments. For example, an operating profile may be generated and recorded by taking ten data points at evenly spaced increments between zero and maximum input, inclusive.

In order to account for the effects caused by environmental variations on sensor output, operating profiles can also be created for an individual sensor as described above, but under a range of operating conditions. For example, when temperature fluctuations are likely to impact sensor output during operation, a number of operating profiles can be developed as described, but over a continuum of operating temperatures. Operating profiles can be developed and analyzed as described below for any relevant environmental conditions that may affect sensor output during later use.

In one exemplary embodiment, operating profiles are developed at operating conditions of sufficiently spaced increments. In this embodiment, the operating profiles are generated based on a continuum of minimum to maximum expected fluctuations in any given operating condition. The operating profiles so generated are recorded at a statistically significant number of approximately evenly spaced increments along the continuum of expected fluctuations in operating condition. For example, when accounting for temperature fluctuations encountered by a sensor during use, operating profiles may be generated and recorded at temperatures of approximately −40° C. to approximately 140° C. in increments of approximately 10° C.

Optionally, in order to confirm that the relationship between sensor input and output for each operating profile generated is linear, standard statistical analysis can be employed. Thus, certain methods of the present invention include a step of verifying that sensor output is a linear function of sensor input at any given operating condition. For example, linear regression can be used to analyze the recorded sensor output data from an operating profile in order to confirm that the relationship is linear. In one embodiment, linear regression shows that the coefficient of determination (i.e., the square of the correlation coefficient) is approximately 100%. If statistical analysis shows that the relationship is not linear, alternative sensor calibration methods should be used to increase the accuracy of those non-linear sensors during use.

Figure 3:
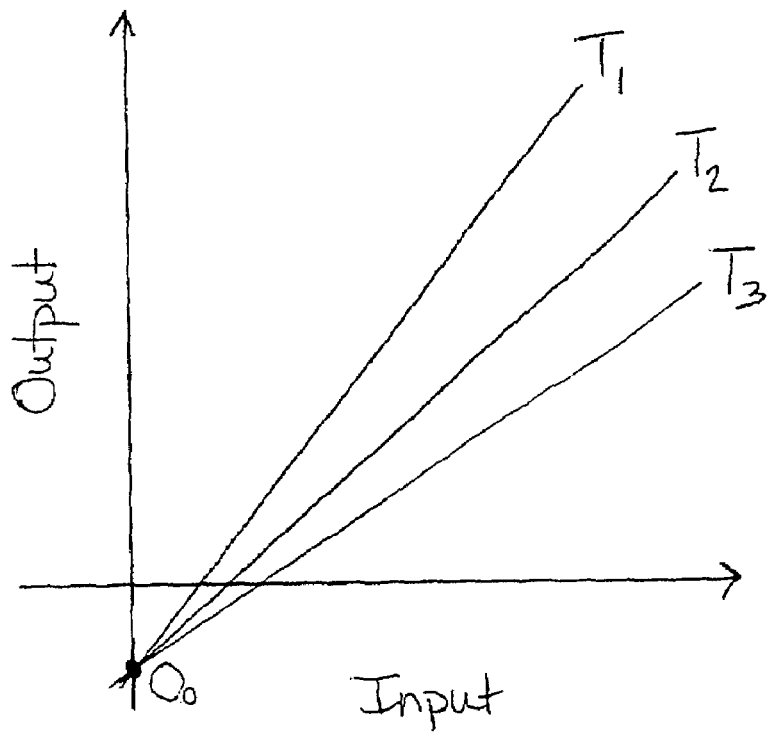
FIG. 3 is a graphical representation of operating profiles generated using the inventive mathematical model at a number of operating conditions.

In one exemplary embodiment, it is useful to also confirm that each operating profile coincides at zero input. To accomplish this task, the operating profiles so generated can be plotted graphically (manually or electronically, for example, using known plotting techniques), as shown for example in FIG. 3. In FIG. 3, three operating profiles (each taken at a different temperatures, $T_1$, $T_2$, and $T_3$) are plotted. Plotting the operating profiles in this manner allows for verification that each operating profile approximately intersects at one point on the graph corresponding to approximately zero input, which is represented by "$O_0$" in FIG. 3.

In one exemplary embodiment, the linear characteristic of each operating profile is then analyzed according to well known mathematical equations and/or calculations. For example, a best fit equation is useful when characterizing the linear relationship. Using a best fit equation, the y-intercept (i.e., measured output at zero input) and slope of each line representing an operating profile can be determined to provide an equation representing the relationship between sensor input and sensor output at a given operating condition.

Optionally, in order to confirm that the relationship between operating profiles developed over a continuum of operating conditions is linear, the relationship between the calculated slope of each operating profile and the associate operating condition can be analyzed. For example, the slope of each operating profile line determined according to the linear characterization described above is plotted against the corresponding operating temperatures along the range of temperature variation. For this task, standard statistical analysis can be employed. For example, linear regression can again be used to confirm that this relationship is linear. In one embodiment, linear regression shows that the coefficient of determination (i.e., the square of the correlation coefficient) is approximately 100%.

Step B: The above statistical analysis of sensor input versus sensor output need be performed only once in the overall method. This statistical analysis, while relatively time-consuming, can be performed in conjunction with normal end-of-line testing after manufacture of the sensors or upon individually testing of the sensors after their purchase and before their assembly into a final product. The statistically significant data so measured and analyzed is compared to data obtained based on minimal testing of an individual sensor at two different operating conditions to obtain a linear equation modeling predicted theoretical output of sensors of that type.

In analyzing the relationship between predicted theoretical output of a sensor and its input, an individual sensor is tested to generate at least four data points. As with the above statistical analysis, in one embodiment the data is generated during end-of-line testing after manufacture of the individual sensor. Alternatively, it can also be generated upon individually testing the sensors after purchase and before or after assembling the sensors into a final product.

For this individual sensor testing, a test stand can be used. In the case of pressure sensors, for example, a hydraulic test stand and manifold with a solenoid valve can be used to test an individual sensor at two different known pressures and room temperature. The sensor test assembly can then be conveyed into a chamber that provides a different operating condition. For example, the sensor test assembly can be conveyed into an insulated chamber maintained at a temperature in which the sensor is again tested at the same two known pressures. The temperature of the chamber can be confirmed using, for example, a reference thermistor.

The data so generated is used in some embodiments to develop two linear equations, each representing the relationship between sensor input and output at a different operating condition (e.g., temperature). While the number of data points used to generate the linear equations can be as many as desired, only four data points are needed for this step. Preferably for this task, at least one output (e.g., voltage) is measured at essentially zero input (e.g., pressure, strain, temperature, torque or other property) at essentially minimum input for an operating condition (e.g., temperature, $T_1$). The same output (e.g., voltage) is then measured at essentially maximum input (e.g., pressure, strain, temperature, torque or other property) for the same operating condition (e.g., temperature, $T_1$). Those same inputs are then used to derive two additional outputs at a second operating condition (e.g., temperature, $T_2$). In effect, this step involves setting a minimum/maximum desired operating condition (e.g., testing temperature), setting a zero/maximum input (e.g., pressure), and measuring output (e.g., voltage) for each of the four conditions.

In case of variations in operating temperature, $T_1$ and $T_2$ can be set at any suitable temperature. For example, $T_1$ and $T_2$ can be selected according to anticipated operating temperature extremes for the sensor, a first being the lowest anticipated operating temperature and a second being the highest anticipated operating temperature. However, it is not necessary that the temperature extremes be selected for $T_1$ and $T_2$. The difference between $T_1$ and $T_2$ need only be sufficient so that the linear relationship can be characterized. In one embodiment, the first temperature and the second temperature differ by at least approximately 40° C.

Each of the two linear equations is then extrapolated from the four data points according to well known mathematical equations and/or calculations. For example, the best fit equation is again useful for this purpose. Using the best fit equation, the y-intercept (i.e., measured output at zero input) and slope of each line can be determined to provide a linear equation representing theoretical output of the sensor under the given operating condition.

Figure 4:
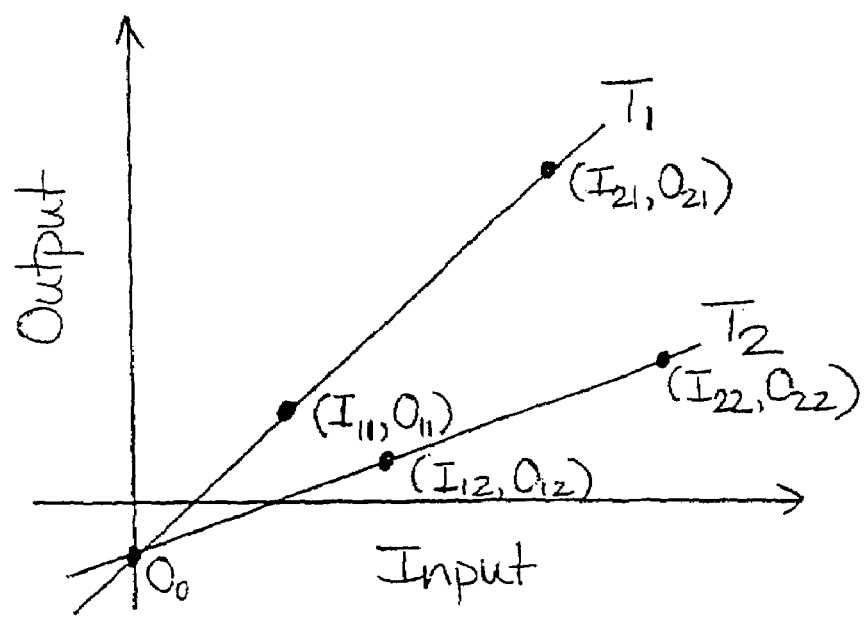
FIG. 4 is a graphical representation of two linear equations representing the relationship between sensor input and output at two different operating temperatures, which have been constructed based on four data points identified therein.

These two linear equations so generated can be represented graphically as shown in FIG. 4. As shown in FIG. 4, the four data points used to generate the two linear equations are represented as $(I_{11}, O_{11})$, $(I_{21}, O_{21})$, $(I_{12}, O_{12})$, and $(I_{22}, O_{22})$.

The slope of each linear equation can then be determined. The value of $b_1$ comprises the slope of a line graphically representing a linear relationship between sensor output and input when measured at the first temperature, $T_1$. The value of $b_2$ comprises the slope of a line graphically representing the linear relationship between sensor output and input when measured at the second temperature, $T_2$. With reference to FIG. 4, the slope of each line is calculated as follows: $b_1=(I_{11}-I_{21})/(O_{11}-O_{21})$ and $b_2=(I_{12}-I_{22})/(O_{12}-O_{22})$. From these two slopes, the slope, b, can be calculated as a function of the operating temperature, T, according to the following equation: $b=b_1+[(b_1-b_2)/(T_1-T_2)](T-T_1)$.

Each of the two linear equations may have the same y-intercept (i.e., measured output at zero input), which is represented in FIG. 4 as $O_0$. $O_0$ is calculated according to the following equation: $O_0=(O_{01}+O_{02})/2$, where $O_{01}=O_{11}-I_{11}/b_1$ and $O_{02}=O_{12}-I_{12}/b_2$. From a practical perspective, $O_0$ would likely be one of the end-of-line test points and would not require calculation.

Step C: From the mathematical equations and calculations in Step B, the following theoretical prediction of the output model evolves: $O=O_0+I/b$. At this stage, it is preferred that the theoretical prediction of the output model then be compared to the statistically significant data measured in Step A. This comparison allows the overall accuracy of the theoretical prediction of the output model to be assessed. This comparison, as with obtainment of the statistically significant measured data, need only be obtained once at each operating condition and can be easily obtained during normal end-of-line testing after sensor manufacture or upon individually testing of the sensors after purchase and before or after assembly into a final product.

In order to compare the measured output data to the theoretical prediction of the output model at a given operating condition, any suitable standard statistical analysis can be used. For example, in order to assess whether the theoretical output represents a normal distribution of actually measured (and statistically significant) output data, the linear equation representing the theoretical prediction of the output model for a single operating condition can be graphically plotted against the actual measured output data at that operating condition. This comparison can be performed for each operating condition for which the statistically significant measured output data is available. The overall accuracy of the theoretical prediction of the output model is determined by statistically interpreting the worst deviation of the actual measured output data from the theoretical prediction of the output model.

Overall accuracy of sensor measurement depends on the application in which the sensor will be used and preferences of those using the sensors or end use customers. For certain industrial applications employing pressure sensors, for example, tolerances of ±0.014 MPa (±2 psi) or less are often needed.

If the tolerances are not found to be acceptable at this stage, manufacturing quality control methods or alternate supplies of commercially available linear sensors can be used to improve the tolerances. If the tolerances are found acceptable, however, the theoretical prediction of the output model can be incorporated into the electronic component of a mechatronic unit in which sensors of that type are to be used during manufacture and final assembly of those units.

Step D: Once developed for a particular type of sensor and confirmed to have an acceptable tolerance level, the theoretical prediction of the output model can be easily stored within an electronic component of a larger mechatronic unit as a calibration algorithm. Stored as such, the theoretical prediction of the output model can be useful in providing a calibration curve for any sensors of the same type that are operatively integrated within the mechatronic unit after manufacture. In one embodiment, the calibration algorithm is stored within a central electronic component of a mechatronic unit in which the sensor or multiples thereof are utilized. For reasons discussed above, this is preferable to providing an individual electronic component (e.g., ASIC) for each individual sensor within a unit.

In addition to the calibration algorithm, individual sensor characterization data may also be stored in the same electronic component of the final mechatronic assembly. The individual sensor characterization data for an individual sensor need comprise only four data points. As compared to previous methods employing calibration algorithms, the need for no more than four data points for each individual sensor greatly simplifies the sensor calibration process and increases efficiency.

In one exemplary embodiment, individual sensor characterization data for each sensor is obtained after final assembly and during normal end-of-line testing of the mechatronic unit. In this manner, inaccuracies caused by variations in final assembly are advantageously reduced.

In this exemplary embodiment, the mechatronic unit is conveyed into a controlled temperature chamber. The temperature of chamber can be confirmed using, for example, a reference thermistor. During this characterization, at least one output (e.g., voltage) is measured at essentially zero input (e.g., pressure, strain, temperature, torque, et cetera) at essentially minimum input for an operating condition (e.g., temperature, $T_1$). The same output (e.g., voltage) is then measured at essentially maximum input (e.g., pressure, strain, temperature, torque or other property) and minimum input for the same operating condition (e.g., temperature, $T_1$). Those same inputs are then used to derive two additional outputs at a second operating condition (e.g., temperature, $T_2$). In effect, this step involves setting a minimum/maximum desired operating condition (e.g., testing temperature), setting a zero/maximum input (e.g., pressure), and measuring output (e.g., voltage) for each of the four conditions.

In case of variations in operating temperature, $T_1$ and $T_2$ can be set at any suitable temperature. For example, $T_1$ and $T_2$ can be set according to anticipated operating temperature extremes for the mechatronic unit, one being set to the lowest anticipated operating temperature, and the second being set to the highest anticipated operating temperature. However, it is not necessary that the temperature extremes be selected for $T_1$ and $T_2$. In one exemplary embodiment, the first temperature and the second temperature differ by at least approximately 40° C. The difference between $T_1$ and $T_2$ need only be sufficient, however, so that a calibration curve can be calculated based on input of the four data points in the calibration algorithm.

The four data points, taking the form of those represented in FIG. 4 as $(I_{11}, O_{11})$, $(I_{21}, O_{21})$, $(I_{12}, O_{12})$, and $(I_{22}, O_{22})$ are then input into the calibration algorithm in a similar manner as that described above with reference to Step B. The four data points are input into the calibration algorithm in order to generate a calibration curve for each sensor within the mechatronic unit. In one embodiment, the data is input according to the following mathematical models: $b_1 = (I_1 - I_{21})/(O_{11} - O_{21})$; $b_2 = (I_{12} - I_{22})/(O_{12} - O_{22})$; and $O_0 = (O_{01} + O_{02})/2$, where $O_{01} = O_{11} - I_{11}/b_1$ and $O_{02} = O_{12} - I_{12}/b_2$. By accounting for variations in operating conditions (e.g., in temperature), the calibration curve allows for continued and accurate measurement of the individual sensors during operation over a wide range of operating conditions.

In one embodiment, the calibration algorithm and individual sensor characterization data obtained after sensor manufacture are electronically stored within a mechatronic unit employing one or more of the sensors. Storage can efficiently occur during end-of-line quality control testing in the final assembly of the mechatronic unit. For example, the calibration algorithm and individual sensor characterization data can, in one embodiment, be burned into non-volatile memory of an electronic component in a binary manner.

When more than one type of sensor (e.g., sensors that measure pressure, strain, temperature, torque, or other property) is included within a mechatronic unit, each type of sensor can be calibrated using a calibration algorithm developed for that particular type of sensor. Thus, final mechatronic units may include more than one calibration algorithm.

Units comprising solenoid operated pressure control valves have found applicability in, for example, controlling the flow of hydraulic fluid in automatic transmissions for motor vehicles. In automatic transmissions of this type, the shifting of transmission speed ratios is controlled by an electronic controller that provides an electrical signal to the solenoid operated valve, which in turn provides a fluid pressure signal to a pressure responsive actuator for effecting a desired transmission speed ratio change. In closed loop control systems, actual pressure output is measured and relayed back to an electronic controller to assist in making any adjustments in pressure that may be needed. In open loop control systems, sensors may be placed, for example, at the inlet of such a valve in order to relay inlet pressure to a dashboard display, for example, inside a motor vehicle. The present invention is applicable to calibration of linear sensors, no matter what type of application or system in which they are utilized.

While the mathematical model and calibration techniques of the invention alone provide improved and continued calibration accuracy during operation, the techniques may be used in conjunction with other calibration methods, such as those described above. Further, it is to be understood that the overall accuracy of a mechatronic unit during operation also depends on acceptable tolerances of other components within the unit, which are determined by the manufacturer of the unit.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A method of analyzing accuracy of linear sensor output based on a theoretical prediction of the output model, the method comprising:

analyzing a statistically significant number of linear sensors to obtain a first operating profile for each sensor at a first operating condition, $T_1$;

analyzing the statistically significant number of linear sensors to obtain a second operating profile for each sensor at a second operating condition, $T_2$;

optionally confirming that each operating profile obtained represents a linear relationship between sensor input and sensor output using reciprocal slopes of output-input lines;

optionally confirming that operating profiles developed over a continuum of operating conditions represent a linear relationship using reciprocal slopes of each operating profile;

individually testing a linear sensor to obtain at least four data points, wherein the four data points correspond to test data obtained based on a first and second input at each of the first and second operating conditions and are represented as follows: $(I_{11}, O_{11})$, $(I_{21}, O_{21})$, $(I_{12}, O_{12})$, and $(I_{22}, O_{22})$;

developing a theoretical prediction of the output model from the four data points and relaying the theoretical prediction of the output model to an electronic component, wherein the theoretical prediction of the output model for determining output at a given operating condition, T, and based on a given input, I, is developed in accordance with the following mathematical equation:

$$\text{Output} = O_0 + I/b,$$

wherein $b = b_1 + [(b_1 - b_2)/(T_1 - T_2)](T - T_1)$, where $b_1 = (I_{11} - I_{21})/(O_{11} - O_{21})$;
$b_2 = (I_{12} - I_{22})/(O_{12} - O_{22})$; and
$O_0 = (O_{01} + O_{02})/2$, where $O_{01} = O_{11} - I_{11}/b_1$ and $O_{02} = O_{12} - I_{12}/b_2$;

comparing accuracy of the relationship between the theoretical prediction of the output model for the first operating condition to sensor output in the first operating profile for the first operating condition corresponding to the given input; and comparing accuracy of the relationship between the theoretical prediction of the output model for the second operating condition to sensor output in the second operating profile for the second operating condition corresponding to the given input.

2. The method of claim 1, further comprising the step of determining overall accuracy of the theoretical prediction of the output model by statistically interpreting worst deviation of the theoretical prediction of the output model from the operating profile for a corresponding operating condition.

3. The method of claim 1, wherein the statistically significant number of linear sensors comprises approximately 30 to about 300.

4. The method of claim 1, wherein the statistically significant number of linear sensors are individually selected from more than one manufacturing lot.

5. The method of claim 1, wherein the statistically significant number of linear sensors are analyzed during normal end-of-line testing after sensor manufacture.

6. The method of claim 1, wherein a selected individual linear sensor is tested to obtain the at least four data points during normal end-of-line testing after sensor manufacture.

7. The method of claim 1, wherein the first and second operating conditions vary essentially only in temperature.

8. The method of claim 1, wherein the first and second operating conditions are temperatures differing by at least 40° C.

9. The method of claim 1, wherein the relationship between sensor input and sensor output in each operating profile is characterized using a best fit equation.

10. A calibration algorithm generating a calibration curve for a linear sensor upon input of four data points,
wherein the calibration algorithm is electronically stored within a memory;
wherein the four data points correspond to test data obtained from the linear sensor based on a first and second sensor input at each of the first and second operating conditions, the four data points individually being represented as follows: $(I_{11}, O_{11})$, $(I_{21}, O_{21})$, $(I_{12}, O_{12})$, and $(I_{22}, O_{22})$; and
wherein the calibration algorithm determines output of a linear sensor at a given operating condition, T, based on a given input, I, and wherein the algorithm conforms to the following mathematical equation:

$$\text{Output} = O_0 + I/b,$$

wherein $b = b_1 + [(b_1 - b_2)/(T_1 - T_2)](T - T_1)$, where $b_1 = (I_{11} - I_{21})/(O_{11} - O_{21})$;
$b_2 = (I_{12} - I_{22})/(O_{12} - O_{22})$; and
$O_0 = (O_{01} + O_{02})/2$, where $O_{01} = O_{11} - I_{11}/b_1$ and $O_{02} = O_{12} - I_{12}/b_2$ wherein the output of the linear sensor determined from the calibration algorithm is relayed to an electronic component.

11. The calibration algorithm of claim 10, wherein the calibration algorithm is electronically stored within a mechatronic unit.

12. A method of generating a calibration curve for a linear sensor, the method comprising:
providing the calibration algorithm of claim 10;
testing an individual sensor to generate four data points, wherein the four data points correspond to test data obtained based on a first and second input at each of a first and second operating condition; and
inputting the four data points into the calibration algorithm to generate the calibration curve for the linear sensor.

13. The method of claim 12, wherein the individual sensor is tested after final assembly into a mechatronic unit.

14. A mechatronic unit comprising:
at least one linear sensor; and
at least one electronic component comprising the calibration algorithm of claim 10 operatively coupled therein for calibration of the at least one sensor.

15. The mechatronic unit of claim 14, wherein the mechatronic unit comprises electrohydraulic components.

16. The mechatronic unit of claim 14, wherein the mechatronic unit comprises at least one solenoid operated pressure control valve.

17. The mechatronic unit of claim 14, Wherein the mechatronic unit operates to control flow of hydraulic fluid in automatic transmissions of motor vehicles.

18. The mechatronic unit of claim 14, wherein the linear sensor comprises a voltage output derived from an input selected from pressure, strain, temperature, and torque.

19. The mechatronic unit of claim 14, wherein the sensor comprises a pressure sensor.

20. An automatic transmission for a motor vehicle comprising the mechatronic unit of claim 14.

21. A method of analyzing accuracy of linear sensor output based on a theoretical prediction of the output model, the method comprising:
optionally analyzing a statistically significant number of linear sensors to obtain a first operating profile for each sensor at a first operating condition, $T_1$;
optionally analyzing the statistically significant number of linear sensors to obtain a second operating profile for each sensor at a second operating condition, $T_2$;
optionally confirming that each operating profile obtained represents a linear relationship between sensor input and sensor output using reciprocal slopes of output-input lines;
optionally confirming that operating profiles developed over a continuum of operating conditions represent a linear relationship using reciprocal slopes of each operating profile;
individually testing a linear sensor to obtain at least four data points, wherein the four data points correspond to test data obtained based on a first and second input at each of the first and second operating conditions and are represented as follows: $(I_{11}, O_{11})$, $(I_{21}, O_{21})$, $(I_{12}, O_{12})$, and $(I_{22}, O_{22})$;
developing a theoretical prediction of the output model from the four data points and relaying the theoretical prediction of the output model to an electronic component, wherein the theoretical prediction of the output model for determining output at a given operating condition, T, and based on a given input, I, is developed in accordance with the following mathematical equation:

$$\text{Output} = O_0 + I/b,$$

wherein $b = b_1 + [(b_1 - b_2)/(T_1 - T_2)](T - T_1)$, where $b_1 = (I_{11} - I_{21})/(O_{11} - O_{21})$;
$b_2 = (I_{12} - I_{22})/(O_{12} - O_{22})$; and
$O_0 = (O_{01} + O_{02})/2$, where $O_{01} = O_{11} - I_{11}/b_1$ and $O_{02} = O_{12} - I_{12}/b_2$;

optionally comparing accuracy of the relationship between the theoretical prediction of the output model for the first operating condition to sensor output in the first operating profile for the first operating condition corresponding to the given input; and optionally comparing accuracy of the relationship between the theoretical prediction of the output model for the second operating condition to sensor output in the second operating profile for the second operating condition corresponding to the given input.

22. A method of analyzing accuracy of linear sensor output based on a theoretical prediction of the output model, the method comprising:

obtaining a first operating profile for each sensor at a first operating condition, $T_1$;

obtaining a second operating profile for each sensor at a second operating condition, $T_2$;

optionally confirming that each operating profile obtained represents a linear relationship between sensor input and sensor output using reciprocal slopes of output-input lines;

optionally confirming that operating profiles developed over a continuum of operating conditions represent a linear relationship using reciprocal slopes of each operating profile;

individually testing a linear sensor to obtain at least four data points, wherein the four data points correspond to test data obtained based on a first and second input at each of the first and second operating conditions and are represented as follows: $(I_{11}, O_{11})$, $(I_{21}, O_{21})$, $(I_{12}, O_{12})$, and $(I_{22}, O_{22})$;

developing a theoretical prediction of the output model from the four data points and relaying the theoretical prediction of the output model to an electronic component, wherein the theoretical prediction of the output model for determining output at a given operating condition, T, and based on a given input, I, is developed in accordance with the following mathematical equation:

$$\text{Output} = O_0 I/b,$$

wherein $b = b_1 + [(b_1 - b_2)/(T_1 - T_2)](T - T_1)$, where $b_1 = (I_{11} - I_{21})/(O_{11} - O_{21})$;
$b_2 = (I_{12} - I_{22})/(O_{12} - O_{22})$; and
$O_0 = (O_{01} + O_{02})/2$, where $O_{01} = O_{11} - I_{11}/b_1$ and $O_{02} = O_{12} - I_{12}/b_2$;

comparing accuracy of the relationship between the theoretical prediction of the output model for the first operating condition to sensor output in the first operating profile for the first operating condition corresponding to the given input; and comparing accuracy of the relationship between the theoretical prediction of the output model for the second operating condition to sensor output in the second operating profile for the second operating condition corresponding to the given input.

23. A method of analyzing accuracy of linear sensor output based on a theoretical prediction of the output model, the method comprising:

optionally obtaining a first operating profile for each sensor at a first operating condition, $T_1$;

optionally obtaining a second operating profile for each sensor at a second operating condition, $T_2$;

optionally confirming that each operating profile obtained represents a linear relationship between sensor input and sensor output using reciprocal slopes of output-input lines;

optionally confirming that operating profiles developed over a continuum of operating conditions represent a linear relationship using reciprocal slopes of each operating profile;

individually testing a linear sensor to obtain at least four data points, wherein the four data points correspond to test data obtained based on a first and second input at each of the first and second operating conditions and are represented as follows: $(I_{11}, O_{11})$, $(I_{21}, O_{21})$, $(I_{12}, O_{12})$, and $(I_{22}, O_{22})$;

developing a theoretical prediction of the output model from the four data points and relaying the theoretical prediction of the output model to an electronic component, wherein the theoretical prediction of the output model for determining output at a given operating condition, T, and based on a given input, I, is developed in accordance with the following mathematical equation:

$$\text{Output} = O_0 + I/b,$$

wherein $b = b_1 + [(b_1 - b_2)/(T_1 - T_2)](T - T_1)$, where $b_1 = (I_{11} - I_{21})/(O_{11} - O_{21})$,
$b_2 = (I_{12} - I_{22})/(O_{12} - O_{22})$; and
$O_0 = (O_{01} + O_{02})/2$, where $O_{01} = O_{11} - I_{11}/b_1$ and $O_{02} = O_{12} - I_{12}/b_2$;

optionally comparing accuracy of the relationship between the theoretical prediction of the output model for the first operating condition to sensor output in the first operating profile for the first operating condition corresponding to the given input; and optionally comparing accuracy of the relationship between the theoretical prediction of the output model for the second operating condition to sensor output in the second operating profile for the second operating condition corresponding to the given input.

* * * * *